US007032396B2

(12) United States Patent
Wood et al.

(10) Patent No.: US 7,032,396 B2
(45) Date of Patent: *Apr. 25, 2006

(54) COOLING METHOD FOR CONTROLLED HIGH SPEED CHILLING OR FREEZING

(75) Inventors: Brian Wood, Lubbock, TX (US); Allan J. Cassell, West Heidelberg (AU)

(73) Assignee: Supachill Technologies Pty. Ltd., (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/276,440

(22) PCT Filed: May 16, 2001

(86) PCT No.: PCT/US01/15821

§ 371 (c)(1),
(2), (4) Date: Apr. 9, 2003

(87) PCT Pub. No.: WO02/14753

PCT Pub. Date: Feb. 21, 2002

(65) Prior Publication Data

US 2004/0045313 A1    Mar. 11, 2004

Related U.S. Application Data

(60) Provisional application No. 60/205,635, filed on May 18, 2000.

(51) Int. Cl.
*F25D 17/02* (2006.01)

(52) U.S. Cl. .......................................... 62/185; 62/434
(58) Field of Classification Search ................. 62/185, 62/434, 177, 430, 62, 76, 114, 201, 203, 204, 62/205
See application file for complete search history.

(56) References Cited

U.S. PATENT DOCUMENTS

| | | | | |
|---|---|---|---|---|
| 4,888,956 A | * | 12/1989 | le Roux Murray | 62/51.1 |
| 5,003,787 A | * | 4/1991 | Zlobinsky | 62/185 |
| 5,191,773 A | * | 3/1993 | Cassell | 62/373 |
| 6,519,954 B1 | * | 2/2003 | Prien et al. | 62/64 |
| 2003/0154729 A1 | * | 8/2003 | Prien et al. | 62/62 |

* cited by examiner

*Primary Examiner*—Chen Wen Jiang
(74) *Attorney, Agent, or Firm*—Raymond M. Galasso; Galasso & Associates, L.P.

(57) ABSTRACT

A cooling method for controlled high speed chilling or freezing is disclosed. Cooling fluid is circulated by a submersed circulator, such as a motor, at a substantially constant velocity past a substance to be cooled. The velocity of fluid flow is maintained despite changes in the viscosity of the cooling fluid, by either increasing or decreasing the amount of torque supplied by the motor. The cooling fluid is cooled to a desired temperature by circulating the fluid past a multi-path heat exchanging coil connected to a refrigeration system. An optimal cooling fluid temperature for a variety of applications is in the range of about −24° C. to −26° C., resulting in significant efficiency gains over conventional cooling processes.

56 Claims, 3 Drawing Sheets

COOLING METHOD FOR CONTROLLED HIGH SPEED CHILLING OR FREEZING

CROSS REFERENCE TO RELATED APPLICATIONS

This application claims benefit under 35 U.S.C. § 119 of U.S. provisional patent application Ser. No. 60/205,635, entitled Cooling Method For Controlled High Speed Chilling or Freezing, which was filed on May 18, 2000. This application claims benefit under 35 U.S.C. § 365 of PCT international application Ser. No. PCT/US01/15821, entitled Cooling Method For Controlled High Speed Chilling or Freezing, which was filed May 16, 2001 now abandoned.

FIELD OF THE INVENTION

The present invention relates generally to cooling methods and more particularly to methods for rapidly cooling, chilling, or freezing various substances.

BACKGROUND OF THE INVENTION

In many industries, rapid cooling, chilling or freezing of items is desirable. While currently available cooling and freezing techniques perform adequately in many instances, numerous industries could benefit from faster or more efficient cooling or freezing methods. Consider, for example, the frozen food industry. The taste, texture, and general appearance of many vegetables, fruits, etc., can vary significantly depending upon the rate at which the item is cooled. Additionally, faster cooling can shorten the time needed to get a frozen food item to market and decrease the amount of inventory storage. For example, if unfrozen product could be received, frozen, and shipped all in the same day, remarkable cost savings might be achieved.

Commercial establishments such as restaurants, hotels, convenience stores, etc. can benefit from rapid cooling of food and beverages that are normally served chilled. For example, if bottled or canned beverages could be chilled quickly enough, only a small number of bottles or cans would need to be kept cool at any one time; most of a stores inventory could be chilled "on demand." As a result, the use of costly, energy consuming refrigerators could be reduced.

Other industries, such as the medical and pharmaceutical industries, may also benefit from rapid cooling of items. These industries rely on various tissues, organs, serums, medicines, etc., to be cooled or frozen. In general, the more quickly such items can be cooled, the longer the items should remain usable.

SUMMARY OF THE INVENTION

Therefore, what is needed is a method of cooling, chilling or freezing food, beverages, pharmaceuticals, or other substances more effectively and/or efficiently. Accordingly, at least one embodiment of the present invention provides a method for cooling substances comprising circulating cooling fluid past a substance to be cooled, and controlling the circulation of the cooling fluid such that the cooling fluid is circulated at a substantially constant predetermined velocity independent of changes in cooling fluid viscosity. In one embodiment, at least one circulator is used to circulate the cooling fluid. In another embodiment, the method includes determining changes in cooling fluid viscosity due to thermal transfer, and altering circulator force to compensate for the changes in cooling fluid viscosity, such that a substantially constant predetermined flow of fluid past the substance is maintained. In at least one embodiment, a circulator comprises a motor and an impeller. Various embodiments circulate cooling fluid past a heat exchanging coil submersed in the cooling fluid. This heat exchanging coil is preferably a "multi-path coil," which allows refrigerant to travel through multiple paths, in contrast to conventional refrigeration coils in which refrigerant is generally restricted to one or two continuous paths. As a result the heat exchanging coil used to implement the present invention can be made approximately fifty percent of the size of a conventional coil required to handle the same heat load. The heat exchanging coil is cooled by a refrigeration unit, and is employed to keep the cooling fluid at a desired temperature.

An object of at least one embodiment of the present invention is to quickly and efficiently cool, chill or freeze various substances.

An advantage of at least one embodiment of the present invention is that sensitive or delicate substances can be frozen without damage to the substance.

Another advantage of at least one embodiment of the present invention is that cooling, chilling or freezing is accomplished more rapidly than by many conventional methods.

Yet another advantage of various embodiments of the present invention is that various substances can be cooled, chilled or frozen more cost effectively due to decreased energy usage.

A further advantage of the present invention is that at least one embodiment employs a heat exchanging coil approximately 50 percent smaller than that used with conventional cooling methods handling the same heat load.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

Figure 1:
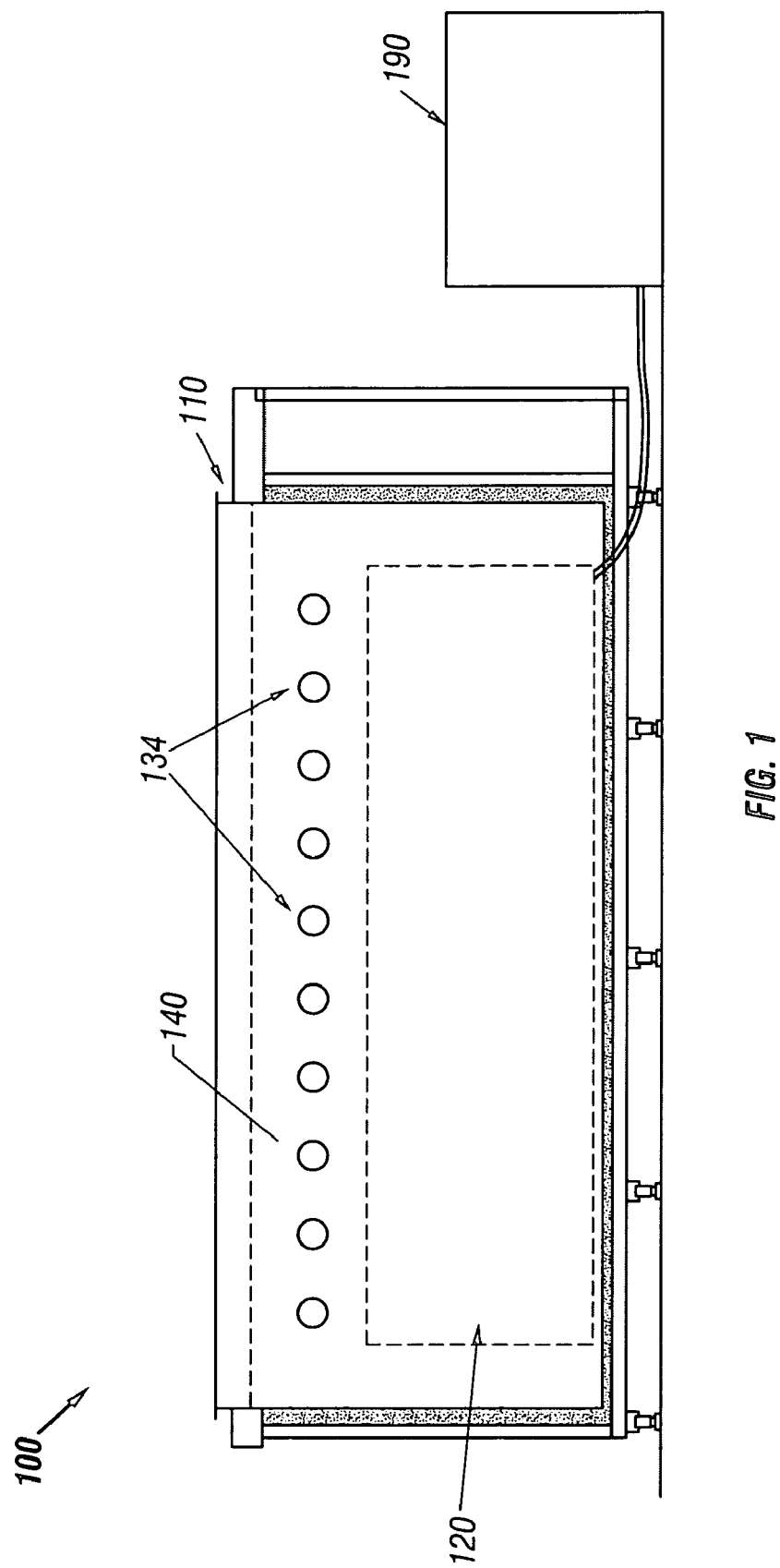
FIG. 1 is a side view of a chilling apparatus suitable for practicing a method according to at least one embodiment of the present invention.
Figure 2:
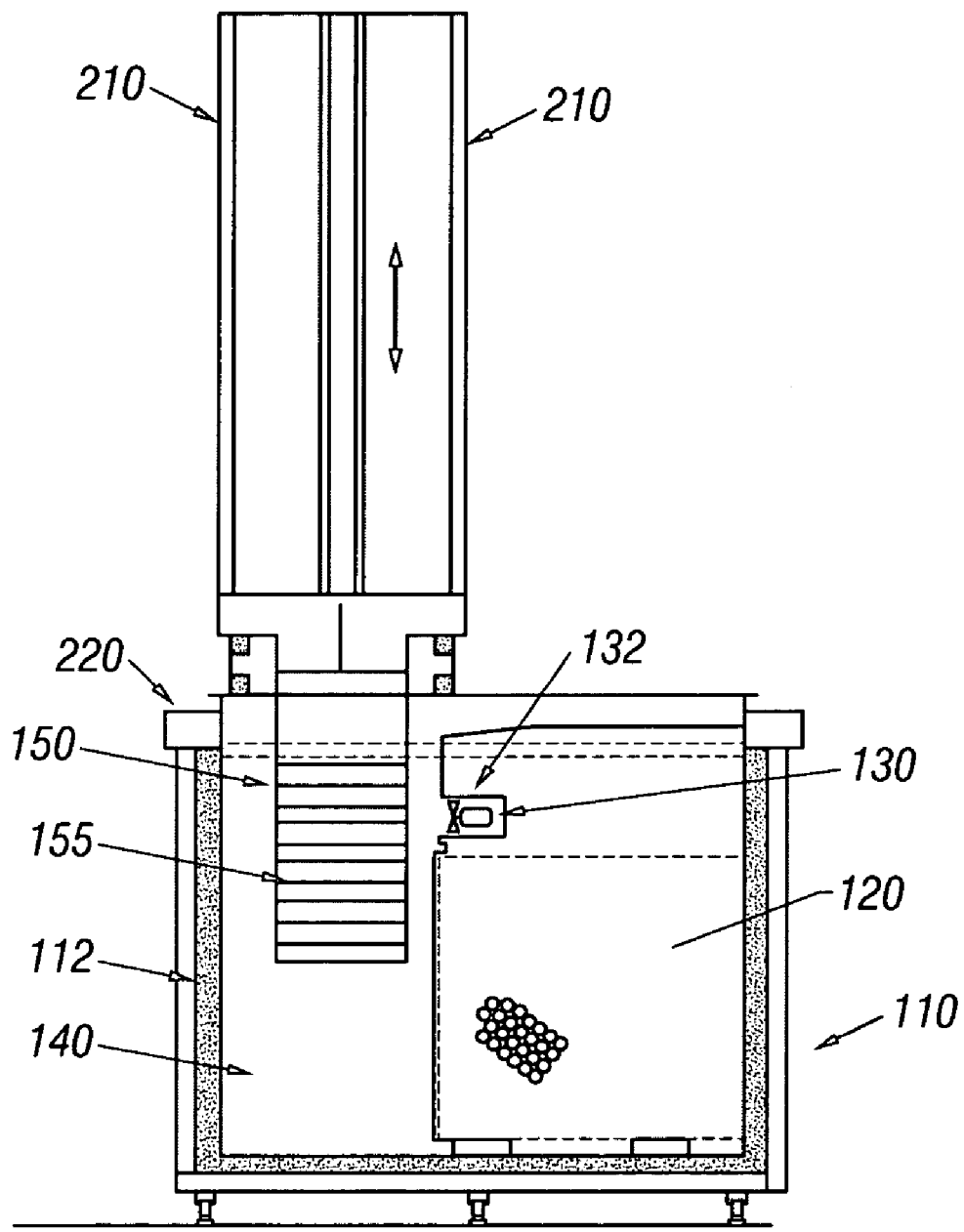
FIG. 2 is an end view of a cross-section of the chilling apparatus illustrated in FIG. 1.

Referring first to FIGS. 1 and 2, a chilling apparatus suitable for practicing a method according to at least one embodiment of the present invention is discussed, and designated generally as cooling unit 100. Cooling unit 100 preferably comprises tank 110 containing cooling fluid 140. Submersed in cooling fluid 140 are circulators 134 such as motors 130 having impellers 132, heat exchanging coil 120, and rack 150, which in one embodiment comprises shelves 155 for supporting substances to be cooled, chilled or frozen. External to tank 110, and coupled to heat exchanging coil 120, is refrigeration unit 190.

Tank 110 may be of any dimensions necessary to immerse substances to be cooled, chilled or frozen in a volume of cooling fluid 140, in which the dimensions are scaled multiples of 12 inches by 24 inches by 48 inches. Other size tanks may be employed consistent with the teachings set forth herein. For example, in one embodiment (not illustrated), tank 110 is sized to hold just enough cooling fluid 140, so that beverage containers, such as wine bottles, milk jugs, soft drink cans, and the like, can be placed in tank 110 for rapid cooling or chilling. In other embodiments, tank 110 is large enough to completely immerse large quantities of meats, vegetables, or other items for rapid freezing. It will be appreciated that tank 110 can be made larger or smaller, as needed to efficiently accommodate various sizes and quantities of substances to be cooled, chilled or frozen. Such substances include, but are not limited to, food items, liquids, pharmaceuticals, or animal, human or plant cells, and the like.

Tank 110 holds cooling fluid 140. In one embodiment, the cooling fluid is a food grade solute. The use of a food grade cooling fluid allows cooling, chilling or freezing of foodstuffs without risk of contamination from the fluid. Good examples of food grade quality fluids are those based on propylene glycol, sodium chloride solutions, or the like. In other embodiments, other fluids, and preferably solutes, are used as cooling fluids. When using a food grade cooling fluid to freeze food items, the food item may be immersed directly in the cooling fluid for rapid and effective freezing. Even relatively delicate food items, such as fish, asparagus and the like, retain their color and texture better than if the same items had been conventionally frozen.

In order to quickly and effectively cool, chill or freeze substances, one embodiment of the present invention circulates cooling fluid 140 past the substance to be cooled, at a relatively constant rate of 35 liters per minute for every foot of cooling fluid contained in an area not more than 24 inches wide by 48 inches deep. The necessary circulation is provided by one or more circulators 134, such as motors 130. In at least one embodiment of the present invention, submersed motors 130 drive impellers 132 to circulate cooling fluid 140 past substances to be cooled, chilled or frozen. Other circulators 134, including various pumps (not illustrated), can be employed consistent with the objects of the present invention. At least one embodiment of the present invention increases the area and volume through which cooling fluid is circulated by employing at least one circulator 134 in addition to motors 130. In embodiments using multiple circulators 134, the area and volume of cooling fluid circulation are increased in direct proportion to each additional circulator employed. For example, in a preferred embodiment, one additional circulator is used for each foot of cooling fluid that is to be circulated through an area of not more than about 24 inches wide by 48 inches deep.

Preferably, motors 130 can be controlled to maintain a constant predetermined velocity of cooling fluid flow past substances to be cooled, chilled or frozen, while at the same time maintaining an even distribution of cooling fluid temperature within +/−0.5° C. at all points within tank 110. The substantially constant predetermined velocity of cooling fluid circulating past substances to be cooled, provides a constant, measured removal of heat, which allows for a controlled, high speed rate of cooling, chilling or freezing. In one embodiment, cooling fluid properties, such as viscosity, temperature, etc., are measured and processed, and control signals are sent to motors 130 to increase or decrease the rotational speed or torque of impellers 132 as needed. In other embodiments, motors 130 are constructed to maintain a given rotational velocity over a range of fluid conditions. In such a case, the torque or rotational speed of impellers 132 imparted by motors 130 are not externally controlled. Of note is the fact that no external pumps, shafts, or pulleys are needed to implement a preferred embodiment of the present invention. Motors 130, or other circulators 134, are immersed directly in cooling fluid 140. As a result, cooling fluid 140 not only cools, chills or freezes the substances placed in tank 110, but cooling fluid 140 also provides cooling for motors 130.

Heat exchanging coil 120 is preferably a "multi-path coil," which allows refrigerant to travel through multiple paths (i.e. three or more paths), in contrast to conventional refrigeration coils in which refrigerant is generally restricted to one or two continuous paths. In addition, the coil size is in direct relationship to the cross sectional area containing the measured amount of the cooling fluid 140. For example, in a preferred embodiment, tank 110 is one foot long, two feet deep and four feet wide, and uses a heat exchanging coil 120 that is one foot by two feet. If the length of tank 110 is increased to twenty feet, then the length of heat exchanging coil 120 is also increased to twenty feet. As a result, heat exchanging coil 120 can be made approximately fifty percent of the size of a conventional coil required to handle the same heat load. As discussed below, circulators 134 such as motors 130, circulate chilled cooling fluid 140 over a substance to be cooled, chilled or frozen, and then transport warmer cooling fluid to heat exchanging coil 120, which is submersed in cooling fluid 140. In at least one embodiment, heat exchanging coil 120 is so designed to remove not less than the same amount of heat from cooling fluid 140 as that removed from the substance to be cooled, chilled or frozen, thereby maintaining the temperature of cooling fluid 140 in a predetermined range. Heat exchanging coil 120 is connected to refrigeration unit 190, which removes the heat from heat exchanging coil 120 and the system.

In a preferred embodiment, refrigeration unit 190 is designed to match the load requirement of heat exchanging coil 120, so that the heat is removed from the system in a balanced and efficient manner, resulting in the controlled, rapid cooling, chilling or freezing of a substance. The efficiency of the refrigeration unit 190 is directly related to the method employed for controlling suction pressures by the efficient feeding of the heat exchange coil 120 and the efficient output of compressors used in refrigeration unit 190.

This methodology requires very close tolerances to be maintained between the refrigerant and cooling fluid 140 temperatures, and between the condensing temperature and the ambient temperature. These temperature criteria, together with the design of the heat exchange coil 120, allows heat exchange coil 120 to be fed more efficiently, which in turn allows the compressor to be fed in a balanced and tightly controlled manner to achieve in excess of twenty-five percent greater performance from the compressors than that which is accepted as the compressor manufacturer's standard rating.

Note that in the embodiment illustrated in FIG. 1, refrigeration unit 190 is an external, remotely located refrigeration system. However, in another embodiment (not illustrated), refrigeration unit 190 is incorporated into another section of tank 110. It will be appreciated that various configurations for refrigeration unit 190 may be more or less appropriate for certain configurations of cooling unit 100. For example, if tank 110 is extremely large, a separate refrigeration unit 190 may be desirable, while a portable embodiment may benefit from an integrated refrigeration unit 190. Such an integration is only made possible by the efficiencies achieved by implementing the principles as set forth herein, and particularly the use of a reduced-size heat exchanging coil.

By virtue of refrigeration unit 190 and heat exchanging coil 120, in a preferred embodiment, the cooling fluid is cooled to a temperature of between −24° C. and −26° C., with a temperature differential throughout the cooling fluid of less than about +/−0.5° C. In other embodiments, the cooling fluid is cooled to temperatures outside the −24° C. to −26° C. range in order to control the rate at which a substance is to be cooled, chilled or frozen. Other embodiments control the circulation rate of the cooling fluid to achieve desired cooling, chilling or freezing rates. Alternatively, the volume of cooling fluid may be changed in order to facilitate a particular cooling, chilling or freezing rate. It will be appreciated that various combinations of cooling fluid circulation rate, cooling fluid volume, and cooling fluid temperature can be used to achieve desired cooling, chilling and freezing rates.

By properly balancing the refrigeration plant and coil size, heat can be removed from a substance up to 80% faster than known conventional refrigeration systems. Additionally, heat removal can be held at a constant rate 24 hours per day. At least one embodiment of the present invention has been shown to provide a performance coefficient greater than 1. Recall that the performance coefficient of a cooling system is $$P_c = \frac{Q_c}{W}$$

where $P_c$ is the performance coefficient, $Q_c$ is the amount of heat removed, and W is the amount of work needed to remove the heat. For example, a system according to the present invention has been shown to be capable of removing 41,000 Watts of heat from a substance to be cooled using only 31,000 Watts of electricity. Using these values to compute the performance coefficient yields the following equation:

$$P_c = \frac{41000 \text{ W}}{31000 \text{ W}} = 1.32$$

which shows that the performance coefficient for at least one embodiment of the present invention is 1.32. In addition, tests have been performed showing that the measured refrigeration load required to freeze a 5 kg piece of Beef Rump from +6° C. to a core temperature of −18° C. is 1479 BTU's. An operational freezer in a normal production process freezes the Beef Rump in 40 hours or more. A method according to at least one embodiment of the present invention has been shown to freeze a 5 kg piece of Beef Rump in approximately 3 hours, a time savings of 37 hours.

In addition to the rapid rate at which substances may be frozen, the controlled rate of cooling, chilling and freezing provided by a preferred embodiment of the present invention can prevent damage to substances being cooled, chilled or frozen (such as the Beef Rump), by preventing the formation of ice crystals and lessening the damage to cell structures.

Referring now to FIG. 2, an embodiment of cooling system 100 suitable for cooling, chilling or freezing relatively large quantities of substances is discussed. Reference numerals in FIG. 2 that are like, similar or identical to reference numerals in FIG. 1 indicate like, similar or identical features. Tank 110 contains cooling fluid 140, into which rack 150 may be lowered. Rack 150 is movably coupled to rack support 210, such that rack 150 may be raised or lowered to facilitate the placement of substances into tank 110.

In use, substances to be cooled, chilled or frozen are placed on shelves 155 of rack 150. Preferably, shelves 155 are constructed of wire, mesh, or otherwise, so that cooling fluid 140 may freely circulate over, under and/or around substances placed thereon. Preferably, once the cooling fluid is chilled to a desired temperature, rack support 210 lowers rack 150 into tank 110, in order to submerge shelves 155 in cooling fluid 140. Lowering rack 150 may be accomplished manually or using various gear, chain, and/or pulley configurations known to those skilled in the art. Circulators 134 circulate cooling fluid 140 across substances placed on shelves 155 to provide quick and controlled cooling, chilling or freezing.

Figure 3:
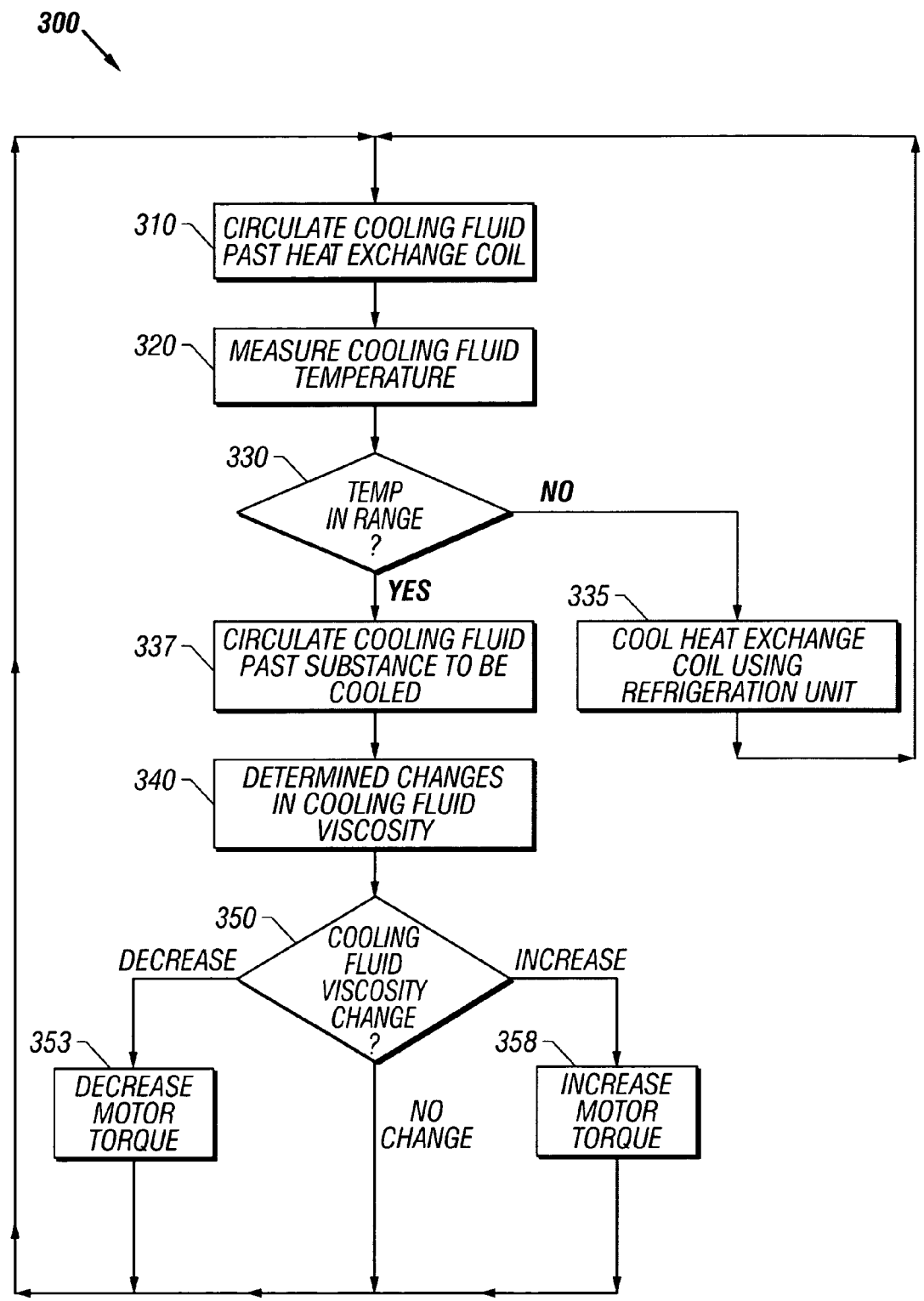
FIG. 3 is a flow diagram illustrating a method according to at least one embodiment of the present invention.

Referring now to FIG. 3, a method according to one embodiment of the present invention is illustrated, and designated generally by reference numeral 300. The illustrated method begins at step 310, where cooling fluid is circulated past a heat exchange coil. The heat exchange coil is operably coupled to a refrigeration system as discussed above, and is used to reduce the temperature of the cooling fluid as the cooling fluid is circulated past the heat exchange coil. In step 320, the temperature of the cooling fluid is measured, and the method proceeds to step 330 where it is determined whether the temperature of the cooling fluid is within an optimal temperature range. This optimal cooling fluid temperature range may be different for different applications, however, a preferred optimal temperature range for many applications is between −24° C. and −26° C.

If the cooling fluid temperature is determined not to be within an optimal, predetermined temperature range, step 335 is performed. In step 335, the heat exchanging coil is cooled by a refrigeration unit, and the method returns to step 310, in which the cooling fluid is circulated past the heat exchange coil in order to lower the temperature of the cooling fluid. Preferably, steps 310, 320, 330 and 335 are performed continually until the cooling fluid reaches the optimal temperature range.

Once the cooling fluid reaches a proper temperature, the method proceeds to step 337, in which a circulator, such as a submersed motor/impeller assembly or pump, is used to circulate the cooling fluid at the velocity previously discussed, past a substance to be cooled, chilled or frozen. As the cooling fluid passes by the substance, heat is removed from the substance, which is at a higher temperature than the temperature of the cooling fluid, and is transferred to the cooling fluid, which transports the heat away from the substance to be cooled, chilled or frozen. As thermal energy is transferred to the cooling fluid, the cooling fluid's viscosity is generally lowered, so that as long as the substance to be cooled is relatively hot compared to the cooling fluid, the viscosity of the cooling fluid having just flowed past the substance is less than the viscosity of the cooling fluid that has just flowed past the heat exchanging coil.

According to at least one embodiment of the present invention, a substantially constant circulation of cooling fluid past the substance to be cooled, chilled or frozen, should be maintained in order to provide a rapid and controlled rate of cooling. However, the flow rate of the cooling fluid is dependent, at least in part, on the viscosity of the cooling fluid. As mentioned in the previous paragraph, the viscosity of the cooling fluid changes. In order to compensate for the changes in cooling fluid viscosity, step 340 is performed to measure the viscosity of the cooling fluid. Step 350 then determines if the viscosity of the cooling fluid has changed, either due to heating of the cooling fluid by the substance or due to chilling of the cooling fluid by the heat exchanging coil. If the cooling fluid's viscosity has increased, step 358 is performed, wherein the force (e.g. torque) supplied by a circulator (e.g. motor and impeller), is increased to compensate for the increased fluid viscosity. Alternatively, if it is determined in step 358 that the cooling fluid viscosity has decreased, step 353 is performed to reduce the force produced by the circulator. If an insignificant change in viscosity is detected, the circulator continues to circulate the cooling fluid with an unchanged amount of force, or torque. The method then returns to step 310, and begins again.

The steps illustrated in FIG. 3 are shown and discussed in a sequential order. However, the illustrated method is of a nature wherein some or all of the steps are continuously performed, and may be performed in a different order. For example, at least one embodiment of the present invention uses a single circulating motor to circulate the cooling fluid. In such an embodiment, cooling fluid is circulated past a heat exchanging coil as in step 310 and past a substance to be cooled in step 337 at the same time. In addition, one embodiment of the present invention measures cooling fluid temperatures and viscosities continually, and at multiple locations within the system.

In yet another embodiment, in step 350 the viscosity of the cooling fluid is not directly measured and compared to a previous measurement in order to determine a change in the cooling fluid viscosity. Rather, the change in cooling fluid viscosity is determined indirectly from the rotational speed of a circulation motor. If the motor is turning at a slower rate, then the viscosity is assumed to be increasing, and additional power can be supplied to the motor to return the motor to the desired rotational speed, thereby compensating for the change in cooling fluid viscosity. In at least one embodiment, a motor is configured to maintain a substantially constant rate of rotation. This substantially constant rate of motor rotation will result in a substantially constant rate of cooling fluid circulation.

At least one embodiment of the present invention cools, chills or freezes substances in a controlled and balanced manner so as to achieve extremely high rates of heat exchange, resulting in a freezing rate up to more than 80% faster than conventional freezing methods. In addition, at least one method according to the present invention freezes at a high speed at a relatively high temperature without causing damage to the substance, and thereby providing a recovery and or preservation rate higher than known conventional freezers. These methods also reduce the amount of electrical energy used by up to over 50% when compared to existing operational freezers.

In the preceding detailed description, reference has been made to the accompanying drawings which form a part hereof, and in which are shown by way of illustration specific embodiments in which the invention may be practiced. These embodiments have been described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description omits certain information known to those skilled in the art. The preceding detailed description is, therefore, not to be taken in a limiting sense, and the scope of the present invention is defined only by the appended claims.

What is claimed is:

1. A method for cooling substances comprising:
   circulating cooling fluid past a substance to be cooled; and
   controlling the circulation of the cooling fluid such that the cooling fluid is circulated at a substantially constant predetermined velocity past the substance to be cooled by associating the circulation with a change in cooling fluid viscosity so as to maintain circulation of the cooling fluid at the substantially constant predetermined velocity even as viscosity of the cooling fluid changes.

2. The method as in claim 1, further comprising circulating the cooling fluid past a heat exchanging coil submersed in the cooling fluid, and wherein the heat exchanging coil is capable of removing the same amount of heat from the cooling fluid as the amount of heat the cooling fluid removes from the substance.

3. The method as in claim 2, wherein the heat exchanging coil is a multi-path coil.

4. The method as in claim 2, wherein the size of the heat exchanging coil is directly related to an area through which the cooling fluid is circulated, wherein the area is about 24 inches wide and 48 inches deep.

5. The method as in claim 2, further comprising cooling the heat exchanging coil with a refrigeration unit substantially matching load requirements of the heat exchanging coil.

6. The method as in claim 1, further comprising maintaining the cooling fluid at a temperature of between about −24 degrees centigrade and −26 degrees centigrade.

7. The method as in claim 1, wherein at least one circulator is used to circulate the cooling fluid, and wherein controlling the circulation comprises controlling the circulator to produce a desired circulation rate.

8. The method as in claim 7, wherein the circulator comprises:
   a motor; and
   an impeller rotatably coupled to the motor such that the impeller rotates to circulate the cooling fluid.

9. The method as in claim 7, wherein an additional circulator is employed for each foot of cooling fluid to be circulated past an area not greater than about 24 inches wide and 48 inches deep.

10. The method as in claim 1, wherein the circulation rate is about 35 liters per minute per foot of cooling fluid through an area not greater than about 24 inches wide and 48 inches deep.

11. The method as in claim 1, wherein the cooling fluid is a solute.

12. The method as in claim 1, further comprising freezing the substance at a controlled freezing rate.

13. The method as in claim 12, wherein controlling the freezing rate comprises controlling the substantially constant predetermined circulation rate of the cooling fluid.

14. The method as in claim 12, wherein controlling the freezing rate comprises controlling the velocity of cooling fluid flowing past the substance to be cooled.

15. The method as in claim 12, wherein controlling the freezing rate comprises controlling the temperature of the cooling fluid.

16. The method as in claim 1, further comprising cooling the substance at a controlled cooling rate.

17. The method as in claim 16, wherein controlling the cooling rate comprises controlling the substantially constant predetermined circulation rate of the cooling fluid.

18. The method as in claim 16, wherein controlling the cooling rate comprises controlling the velocity of cooling fluid flowing past the substance to be cooled.

19. The method as in claim 16, wherein controlling the cooling rate comprises controlling the temperature of the cooling fluid such that the temperature differential throughout the cooling fluid is maintained within about 0.5 degrees centigrade.

20. A method for cooling substances comprising:
circulating cooling fluid past a substance to be cooled using at least one circulator; and
controlling the at least one circulator to maintain a substantially constant predetermined velocity of cooling fluid circulated past the substance to be cooled, wherein said controlling the at least one circulator includes changing at least one operating parameter of the at least one circulator while the cooling fluid is being circulated in response to associating a change in at least one operating parameter of the at least one circulator with a change in cooling fluid viscosity thereby maintaining circulation of the cooling fluid at the substantially constant predetermined velocity even as viscosity of the cooling fluid changes.

21. The method as in claim 20, further comprising circulating the cooling fluid, at the substantially predetermined velocity, past a heat exchanging coil submersed in the cooling fluid, and wherein the heat exchanging coil is capable of removing at least the same amount of heat from the cooling fluid as the amount of heat the cooling fluid removes from the substance.

22. The method as in claim 21, wherein the heat exchanging coil is a multi-path coil.

23. The method as in claim 21, wherein the size of the heat exchanging coil is directly related to an area through which the cooling fluid is circulated, wherein the area is about 24 inches wide by 48 inches deep.

24. The method as in claim 21, further comprising cooling the heat exchanging coil with a refrigeration unit substantially matching load requirements of the heat exchanging coil.

25. The method as in claim 20, further comprising maintaining the cooling fluid at a temperature of between about −24 degrees centigrade and −26 degrees centigrade.

26. The method as in claim 20, wherein controlling the at least one circulator comprises adjusting the force exerted by the circulator on the cooling fluid such that the substantially constant predetermined velocity of the cooling fluid circulated past the substance to be cooled is maintained.

27. The method as in claim 20, wherein the circulation rate is about 35 liters per minute per foot of cooling fluid through an area not greater than about 24 inches wide and 48 inches deep.

28. The method as in claim 20, wherein the circulator comprises:
a motor; and
an impeller rotatably coupled to the motor such that the impeller rotates to circulate the cooling fluid.

29. The method as in claim 20, wherein an additional circulator is employed for each foot of cooling fluid to be circulated past an area not greater than about 24 inches wide and 48 inches deep.

30. The method as in claim 20, wherein the cooling fluid is a solute.

31. The method as in claim 20, further comprising freezing the substance at a controlled freezing rate.

32. The method as in claim 31, wherein controlling the freezing rate comprises controlling the substantially constant predetermined velocity of the cooling fluid circulated past the substance to be cooled.

33. The method as in claim 31, wherein controlling the freezing rate comprises controlling the volume of cooling fluid.

34. The method as in claim 31, wherein controlling the freezing rate comprises controlling the temperature of the cooling fluid.

35. The method as in claim 20, further comprising cooling the substance at a controlled cooling rate.

36. The method as in claim 35, wherein controlling the cooling rate comprises controlling the substantially constant predetermined velocity of the cooling fluid circulated past the substance to be cooled.

37. The method as in claim 35, wherein controlling the cooling rate comprises controlling the volume of cooling fluid.

38. The method as in claim 35, wherein controlling the cooling rate comprises controlling the temperature of the cooling fluid such that the temperature differential throughout the cooling fluid is maintained within about 0.5 degrees centigrade.

39. A method for cooling a substance comprising:
circulating cooling fluid past the substance using at least one circulator;
determining changes in cooling fluid viscosity due to thermal transfer; and
altering circulator force to compensate for the changes in cooling fluid viscosity, such that a substantially constant predetermined velocity of fluid past the substance is maintained.

40. The method as in claim 39, further comprising circulating the cooling fluid at the substantially constant predetermined velocity past a heat exchanging coil submersed in the cooling fluid, and wherein the heat exchanging coil is capable of removing at least the same amount of heat from the cooling fluid as the amount of heat the cooling fluid removes from the substance.

41. The method as in claim 40, wherein the heat exchanging coil is a multi-path coil.

42. The method as in claim 40, wherein the size of the heat exchanging coil is directly related to an area through which the cooling fluid is circulated, wherein the area is about 24 inches wide and 48 inches deep.

43. The method as in claim 40, further comprising cooling the heat exchanging coil with a refrigeration unit substantially matching load requirements of the heat exchanging coil.

44. The method as in claim 39, further comprising maintaining the cooling fluid at a temperature of between about −24 degrees centigrade and −26 degrees centigrade.

45. The method as in claim 39, wherein the circulation rate is about 35 liters per minute per foot of cooling fluid through an area not greater than about 24 inches wide and 48 inches deep.

46. The method as in claim 39, wherein the circulator comprises:
a motor; and
an impeller rotatably coupled to the motor such that the impeller rotates to circulate the cooling fluid; and wherein
the circulator force is a torque supplied by the motor.

47. The method as in claim 39, wherein an additional circulator is employed for each foot of cooling fluid to be circulated past an area not greater than about 24 inches wide and 48 inches deep.

48. The method as in claim 39, wherein the cooling fluid is a solute.

49. The method as in claim 39, further comprising freezing the substance at a controlled freezing rate.

50. The method as in claim 49, wherein controlling the freezing rate comprises controlling the substantially constant predetermined circulation rate of the cooling fluid.

51. The method as in claim 49, wherein controlling the freezing rate comprises controlling the volume of cooling fluid.

52. The method as in claim 49, wherein controlling the freezing rate comprises controlling the temperature of the cooling fluid.

53. The method as in claim 39, further comprising cooling the substance at a controlled cooling rate.

54. The method as in claim 53, wherein controlling the cooling rate comprises controlling the substantially constant predetermined circulation rate of the cooling fluid.

55. The method as in claim 53, wherein controlling the cooling rate comprises controlling the velocity of the cooling fluid flowing past the substance to be cooled.

56. The method as in claim 53, wherein controlling the cooling rate comprises controlling the temperature of the cooling fluid such that the temperature differential throughout the cooling fluid is maintained within about 0.5 degrees centigrade.

* * * * *